United States Patent [19]

Scotti

[11] Patent Number: 4,671,695

[45] Date of Patent: Jun. 9, 1987

[54] DEVICE FOR RAPIDLY FIXING THE ENDS OF CABLES AND THE LIKE

[75] Inventor: Marino D. Scotti, Milan, Italy

[73] Assignee: Douglas Marine s.r.l., Milan, Italy

[21] Appl. No.: 882,346

[22] Filed: Jul. 7, 1986

Related U.S. Application Data

[63] Continuation-in-part of Ser. No. 749,667, Jun. 28, 1985, Pat. No. 4,627,762.

[30] Foreign Application Priority Data

Nov. 2, 1984 [IT] Italy ................ 23688/84[U]

[51] Int. Cl.$^4$ .................... F16B 2/00; F16G 11/00
[52] U.S. Cl. ..................... 403/213; 24/265 AL
[58] Field of Search .......... 403/369, 213; 24/136 R, 24/115 M, 265 AL

[56] References Cited

U.S. PATENT DOCUMENTS

| | | | |
|---|---|---|---|
| 1,401,494 | 12/1921 | Rhorer et al. ............. | 24/136 R |
| 2,127,115 | 8/1938 | Hamilton .................. | 24/115 M |
| 2,463,144 | 3/1949 | Buchanan ................. | 403/369 |
| 2,811,378 | 10/1957 | Kalista ..................... | 403/78 X |
| 3,078,112 | 2/1963 | Mathey .................... | 403/369 X |
| 3,098,275 | 7/1963 | Schweitzer ............... | 403/365 |
| 3,172,180 | 3/1965 | Baricevic et al. .......... | 403/2 |
| 3,220,677 | 11/1965 | Sweeney .................. | 403/213 X |
| 3,241,204 | 3/1966 | Baricevic et al. .......... | 403/13 |
| 3,253,308 | 5/1966 | Jost ........................ | 403/213 |
| 3,895,879 | 7/1975 | Burtelson ................. | 403/369 |
| 3,912,406 | 10/1975 | McGrath .................. | 403/19 |

FOREIGN PATENT DOCUMENTS

| | | | |
|---|---|---|---|
| 713750 | 7/1965 | Canada ................... | 403/369 |
| 869923 | 6/1961 | United Kingdom ...... | 24/115 M |
| 941381 | 11/1963 | United Kingdom ...... | 24/115 M |

Primary Examiner—Andrew V. Kundrat
Attorney, Agent, or Firm—Buckman and Archer

[57] ABSTRACT

The device comprises a base (1) having an opening and a tapered orifice (7) in the interior. A conical body (8) is housed within the tapered orifice, the conical body (8) consisting of two elements (10) which form a central threaded opening (9). The elements (10) resist longitudinal displacement but are capable of radial displacement. The elements (10) are identical and each one of them is provided with a recess and a projection so that they can engage with each other.

The device also comprises a spring and a closure head (14).

2 Claims, 4 Drawing Figures

DEVICE FOR RAPIDLY FIXING THE ENDS OF CABLES AND THE LIKE

This application is a continuation-in-part of U.S. Ser. No. 749,667 filed June 28, 1985 and now U.S. Pat. No. 4,627,762.

The present invention relates to devices for rapidly fixing the ends of cables, ropes and the like and more specifically to cables made or rigid material such as, for instance, steel cables, iron rods, etc., which are intended to be placed under tension.

The invention has applications in many fields even totally unrelated such as, for instance, the nautical field as well as the installation of power lines in electrification, construction, etc.

At present, the most widely used system for fixing the end of a cable to a fixed support consists of passing the end around an element of the support such as, for instance, a metallic ring or a pin, wrapping the end of the cable itself in such a manner as to form a loop-like structure and finally fixing the two superimposed ends of the cable by means for instance, of auxiliary clamping devices with a screw or by pressure coupling.

It is clear, however, that this system involves long and laborious operations which become even risky when it is necessary to carry them out under conditions which may not be easy such as, for instance, on top of a support electrification pole where ordinary tie rods must be fixed.

One object of the present invention is to avoid the drawbacks mentioned hereinabove and to provide a device which makes the operation of fixing the ends of the cable very simple and which cuts down the time required for the operation to a few seconds.

Another object of the present invention is to provide a fixing device which is simple, which is easily assemblable and easily dismountable and which consists of interchangeable elements for fixing the cables and the like to a fixed body.

The device, according to the present invention which permits to fix rapidly the ends of cables, ropes and the like, comprises a trunco-conical element which is provided in the interior with a conical orifice of variable taper between 3° and 6°. To this element is fixed by means of screws, a head which carries means for fixing to a fixed or mobile support, having teeth of about 6° to 45°. The internal conical body of equal taper is provided with a central threaded orifice and is constituted by two shaped elements which serve one as the female element and the other as the male element.

An helicoidal spring having conical profile is seated between the conical body and the head for the purpose of placing the conical insert in front of the base of the opening, where the rope or cable is introduced.

The conicity of the conical body is equal to that of the conical opening which is internally provided in the base.

According to the different applications, the interchangeable elements carried by the trunco-conical body for fixing to the support may be: a head provided with an opening or an eye or having a fork, a threaded ball with a turn-buckle, a small block or a device commonly called nipples which serves the purpose of forming with another trunco-conical body a double cone useful for connection with the head or any other device suitable for this purpose.

The interchangeable elements carry in their internal base, a blind orifice of diameter greater than the diameter of the cable to exit from the internal conical body thus guaranteeing the maximum gripping of the teeth along their entire length.

The interchangeability of the fixing elements constitutes one of the most advantageous features of the invention. Indeed, a single blocking device may be adapted to several applications with great simplicity and economy without the necessity of using a great number of different devices.

In order to fix the end of a cable to the support according to the present invention, it is sufficient to insert the cable in the opening at the base, let the cable advance in the interior of the opening provided in the conical body so that the two portions of the conical body separate themselves without being misaligned in order to let the cable go through, keeping in mind that the cable has a diameter greater than the opening and, then letting the cable come out from the internal conical body.

After this step, the end of the cable remains held tightly in the interior of the conical body because the cable by traction, tends to let the two parts of the conical body come closer due to the tapering of the orifice of the base and the attrition between the cable and the orifice of the conical body.

Other features of the invention will become clear from the following detailed description and attached drawings keeping in mind that they are only provided by way of illustration of the invention of which:

Figure 1:
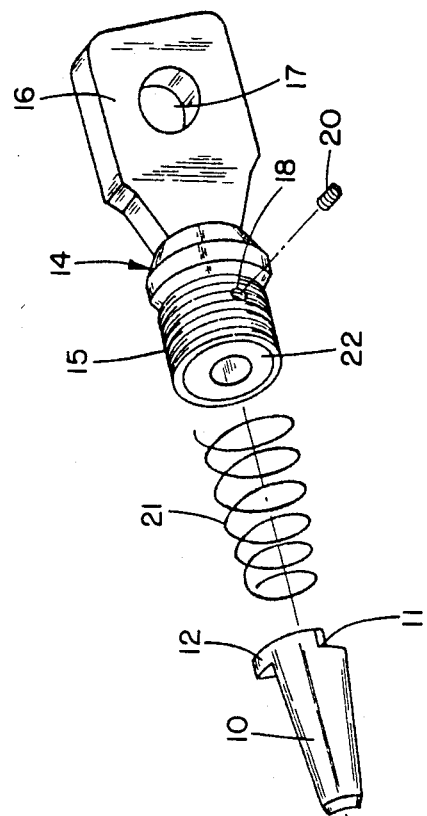
FIG. 1 is an exploded axonometric view partially in cross section and partially split of the fixing device according to a first embodiment of the present invention.

By reference to the drawings, the device for fixing the ends of a cable and the like according to the present invention comprises a trunco-conical body 1, the latter having a small cylindrical portion 2 and connected to an intermediate conical portion 3 and having another cylindrical portion 4 of greater diameter. The portion 4 is internally threaded as shown by numeral 5. The external contour of the base 1 is not crucial and may have several configurations different from the configuration shown.

An essential feature of the invention is that the intermediate portion 3 be internally conically tapered as shown in FIG. 1, in cross section. FIG. 1 also shows the conical orifice of portion 3 designated by numeral 7, which is connected with the orifice 6 in the section 2. The orifice 6 is of smaller diameter.

In the interior of the base 2 and specifically within the conical orifice 7, is seated a conical body designated by numeral 8 which is centrally threaded as shown by numeral 9. The conical body 8 consists of two shaped elements, a male and a female element so that they can engage easily and without the possibility of being offset with respect to one another.

In the example shown in the drawings, the two elements of portion 8 are identical and for this reason, are designated with the same numeral 10, but serve as a male and a female element. Each element 10 is one-half cone and is provided with a cut-out 11 and in the opposite end with corresponding projection 12.

Figure 2:
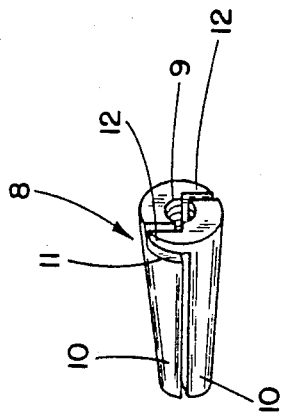
FIG. 2 is an axonometric view from a different the conical body which holds the cable.
Figure 3:
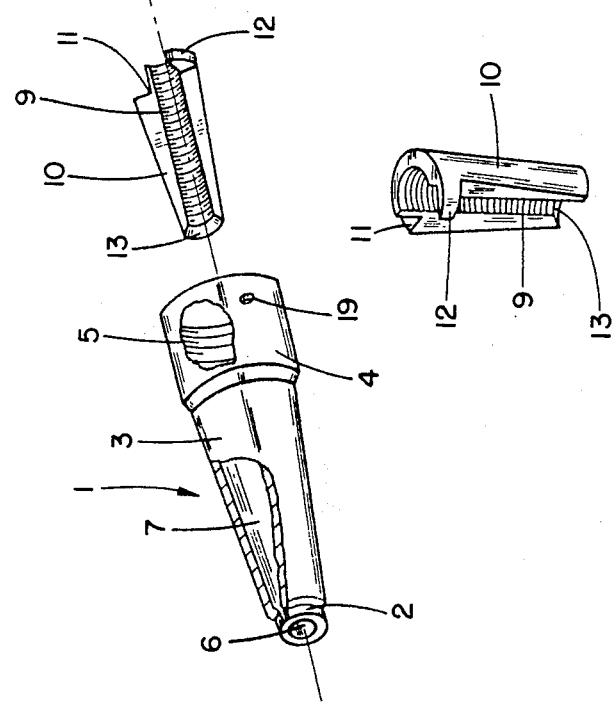
FIG. 3 is an axonometric view from another angle of one of the two elements which constitute the conical body of FIG. 2.

The cut-out 11 and the projection 12 complement each other so that in the coupling of the two portions 10, to form the conical body 8, the cut-out portion 11 of one element and the projection 12 of another element engage each other as shown in FIG. 2. Obviously, the coupling shown is one of the possible coupling of a male and a female element for the purpose of avoiding any eventual uncoupling. It should also be noted that the two portions 10 could be perfect half cones coupled between themselves by any devices such as a ring inserted in suitably placed cavities without interfering with the threaded opening 9 and capable of preventing axial displacement between the two portions 10. It is also possible, in the alternative to fix the two half-cones at their base by means of rings made of plastic material, for instance, rubber. The conical body 8 on the base of a small diameter is bevelled as shown by numeral 13 towards the threaded opening 9 in order to facilitate the insertion of the end of the cable as it will be described in more detail hereinbelow.

To the base 1, is screwed a closure head 14 which presents a threaded cylindrical portion 15 capable of engaging with the internal threading 5 of the cylindrical portion 4 On base 1. The head 14 ends with a plate portion 16 which is provided with an opening 17, the latter serving to fix the device according to the invention of a fixed or mobile support.

Clearly other means for fixing the head 14 to a support may be used in substitution of the plate 16 and the opening 17 and for instance, a fork or a shaft with a connection pivot or a threaded bar and so forth, may be used according to the different requirements.

Along the threaded portion 15 of the head 14, a blind opening 18 may be provided, which when the head 14 is screwed to the base 1, is perfectly aligned with corresponding opening 19 provided in the cylindrical portion 4 of the base 1. At least the opening 19 which is provided in the base 1 is threaded so that the insertion of a dowel 20 ensures proper fixing between the base and the head and prevents a spontaneous unscrewing which may occur due to eventual tortional forces acting during the fixing operation.

Further, in the interior of the base 1, is arranged an helicoidal spring 21 which has a conical profile and which is inserted between the larger base of the conical body 8 and the flat of the cylindrical portion 15 of the head 14 which is provided within the blind opening 22.

The assembly of the device according to the present invention is extremely simple. It is sufficient actually to insert the conical body 8 and the spring 21 in the base 1 and to screw the head 14 to the base 1. If the device is likely to remain in the selected position for a long time, or if it is subject to torsional forces, also the dowel 20 is screwed into place.

The fixing operation of the cable is carried out very simply and rapidly. It is in fact very simple to insert the end of the cable in the opening 6 which is located in the entry portion of the base 1 and to push it forwardly. The bevelled portion 13 of the conical body 8 facilitates the entry of the cable in the threaded portion 9 where, the cable, while it proceeds forwardly, simultaneously it causes an axial displacement of the entire conical body 8 in the direction of advancement of the cable against the small resistance of the spring 21 and also causes a radial separation of the two elements 10, it being understood that the diameter of the cable is greater than the diameter of the opening 9.

After the insertion, that is for instance, when the end of the cable projects beyond the larger base of the conical body 8, the final fixing is ensured without requiring any other operation.

In fact, due to the force exerted by the spring 21 and also due to the traction exerted on the cable which normally must be under tension, the conical body 8 has a tendency to displace itself in the same direction due to the strong friction between the cable and the threading 9. Simultaneously, the two pieces 10 have a tendency to get closer to each other as much as possible, because they are pushed in this direction due to the narrowing of the diameter of the conical orifice 7 of the base 1.

It is important that in this phase, the two elements 10 of the conical body 8 do not become misaligned between themselves and this is prevented by the fact that the two elements couple because they are one a male and the other a female element.

The threaded portion 9 serves the function of gripping the cable and preventing the sliding off. This could be achieved by other systems such as teeth formed in the interior of the element 10. The reason for preferring, however, the threading, is that in this manner, the mechanical operations required to obtain the conical body 8 are simplified.

In order to free the end of the cable from the fixing device, according to the present invention, it is necessary and sufficient to unscrew the base 1 from the head 14.

Figure 4:
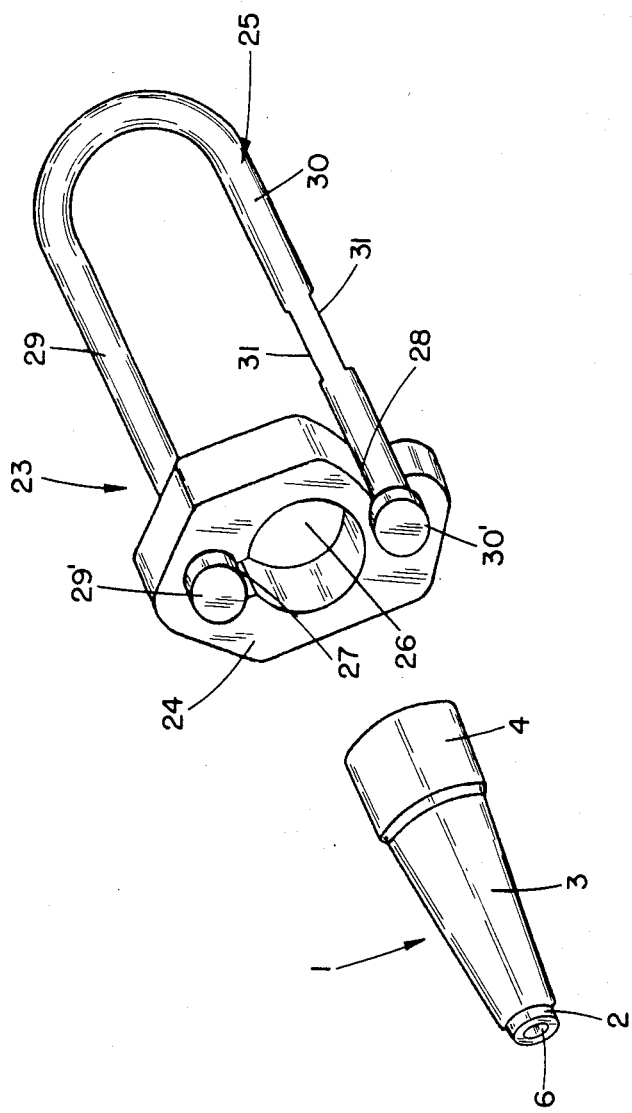
FIG. 4 is an axonometric view of the fixing device according to a second embodiment of the invention, showing a particular element for fixing the device to a support.

In the embodiment shown in FIG. 4, the fixing device 1 is substantially identical to that shown in FIG. 1, with the difference that the closure head 14 is eliminated and the trunco-conical body or base 1 is closed at its larger end in any suitable way, for instance by means of a circular plate on which said end is turned over. The circular plate may be provided with a central hole.

Of course, it is not necessary in this case that the portion 4 of the base 1 be internally threaded.

The fixing device 1 of FIG. 4 can be fixed to a support by means of a coupling element, generally indicated at 23, comprising a base shaped plate 24 and a U-shaped stirrup 25. The base plate 24 has a central hole 26 into which is inserted the conical portion 3 of the fixing device 1, and rests for abutment of the cylindrical portion 4 against the base plate.

In the base plate 24 are also provided two further holes 27 and 28 into which are inserted and secured the two arms 29 and 30 of the U-shaped stirrup 25, which free ends 29' and 30' have a larger diameter with respect to that of the arms.

The hole 27 communicates with the central hole 26, whilst the hole 28 is opened outwardly and the relevant engaged arm 30 is provided with two opposite grooves 31, in such a way that the U-shaped stirrup 25 may be disengaged from the base plate 24, by shifting its arms in the relevant holes and by rotating it around the arm 29, when the grooves 31 of arm 30 are positioned in the "opened" hole 28.

Clearly the device according to the present invention which permits to fix rapidly the ends of a cable described hereinabove, by reference to two of the preferred embodiments of the invention, may be suitably modified according to the different requirements of different applications without departing from the scope of the invention which is limited only by the appended claims.

I claim:

1. A device for fixing cables, ropes and the like to a support, which comprises (1) a base (1) having an opening (6) and a tapered orifice (7) in the interior thereof; (2) a conical body (8) housed within the said tapered orifice, said conical body (8) consisting of two elements (10) which form a central threaded opening (9), said elements (10) being held among themselves to prevent relative longitudinal displacement but capable of radial displacement; (3) a spring (21) acting against said conical body (8), said elements (10) being so shaped whereby one is a male element and the other is a female element; said base (1) being closed to the distal end for the entry of said cable by a circular plate on which said end is turned over; (4) a coupling element (23) for fixing the device to a support, consisting of a shaped plate (24) and a U-shaped stirrup (25), said plate (24) having a central hole (26) into which is inserted and secured said base (1), and two further holes (27) and (28), the first communicating with the said central hole (26) and engaging an arm (29) of the U-shaped stirrup (23), and the second engaging the other arm (30) of said U-shaped stirrup (23), on which arm (30) two opposite grooves (31) are provided, both arms (29, 30) being secured to the shaped plate (24) by relevant enlarged free ends (29', 30').

2. The device according to claim 1 wherein said circular plate closing the distal end of said base (1) for the entry of said cable, is provided with a central hole.

* * * * *